UNITED STATES PATENT OFFICE.

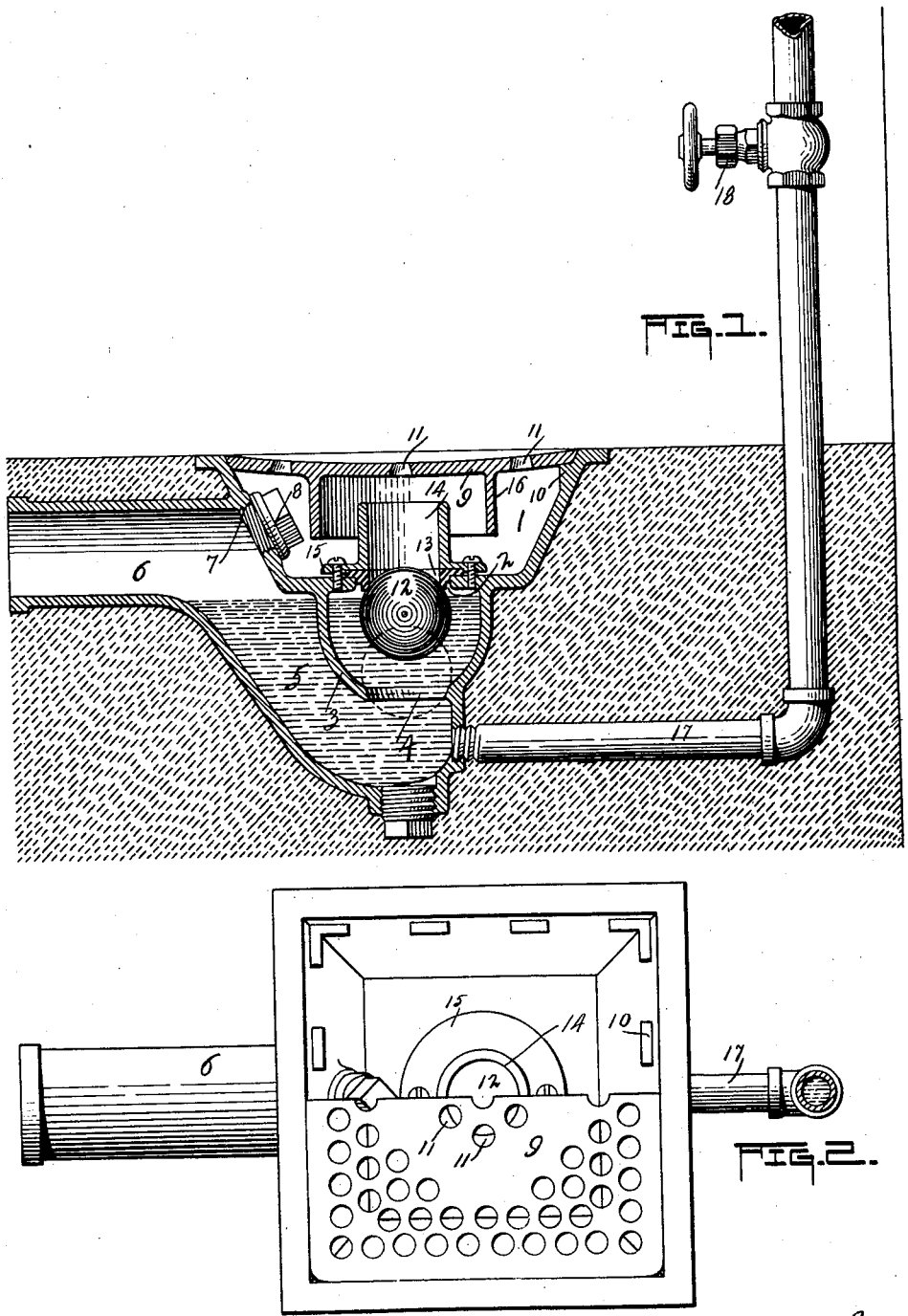

FRANCIS A. McLOUGHLIN, OF PEORIA, ILLINOIS.

CELLAR-DRAIN AND BACKWATER-TRAP.

997,928.  Specification of Letters Patent. Patented July 11, 1911.

Application filed August 27, 1908. Serial No. 450,477.

*To all whom it may concern:*

Be it known that I, FRANCIS A. MCLOUGHLIN, a citizen of the United States, residing at Peoria, in the county of Peoria and State of Illinois, have invented certain new and useful Improvements in Cellar-Drains and Backwater-Traps; and I do hereby declare that the following is a full, clear, and exact description of the invention, which will enable others skilled in the art to which it appertains to make and use the same.

This invention has reference to certain new and useful improvements in traps and relates particularly to a sewer-trap or that class of trap which is used for connecting cellar-drains with a sewer, and which may be placed in any situation where water is to be drained off and provided with means for automatically cutting off the escape of sewer-gas or the backing up of water through said trap.

A further object of the invention is to construct a trap wherein the liability of the trap becoming airbound is entirely obviated.

A further object of the invention is to construct a trap communicating with an outlet pipe, preferably formed integral therewith and with a clean-out opening forming a connection between the sink of the trap and said pipe, and connected with the base of the trap a valved pipe leading to a water supply under pressure.

For a further and full description of the invention herein and the merits thereof and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which:—

Figure 1 is a greatly reduced vertical longitudinal sectional view of the trap and component parts thereof, showing the trap substantially as it appears when installed for actual use, and Fig. 2 is a plan view of the trap, with a portion of the perforated covering of the sink cut away to disclose to view parts therebeneath.

Like numerals of reference denote corresponding parts throughout the figures.

The body of the trap, including a sink portion, trap therebeneath and pipe or neck portion leading from the base of the trap are preferably formed integral; however, under certain conditions it may be found desirable to make these portions of the trap separate and join the same by suitable means.

The trap comprises the receiving or sink portion 1, which may be of rectangular or other suitable form, and which preferably tapers downwardly, as shown; the bottom of the sink portion has the circular opening 2 and depending from said sink portion is a bowl shaped trap portion 3, its wall formed integrally with and depending from the bottom of the sink portion, with an opening 4 in the bottom of the trap portion which communicates with a chamber 5 thereneath, said chamber extending upwardly and diagonally and partially about the trap portion 3 and opens into or communicates with a laterally extended pipe portion or neck 6, with which other sections of pipe may be joined, and has an open end to empty into any such pipe sections that may be connected thereto. The center of the pipe or neck portion 6, aforesaid, passes preferably through the sink portion 3 of the trap, at a point removed a suitable distance above the bottom of said sink portion, and in the wall of the sink portion, which, it may be said forms the inner end wall of the pipe 6 a threaded opening 7 is provided, into which may be screwed, a plug 8, operated from within the sink portion, as is apparent from an examination of the figures. This opening 7, with its plug 8 forms a clean out, whereby access may be had to the pipe 6 through the sink portion 1, upon the removal of the strainer or perforated covering plate 9, for the sink.

The plate 9 rests upon lugs 10 formed integral with and projecting inwardly from the inner side of the side walls of the sink portion 3, and said plate 9 is substantially saucer shaped as shown, and provided with a plurality of perforations 11 arranged in two sets; one set disposed centrally of the plate 9 and the other set including quite a number of perforations and placed all around the outer portion of the said plate.

The circular opening 2 in the bottom of the sink portion 1 is of a size to admit the passage therethrough of a suitable sized ball-valve 12 into the trap 3 and said ball-valve, as will be understood, is preferably of such a material, so as to be buoyant and of sufficient strength to resist the pressure of back water, should there be any. A valve seat is provided for the opening 2 in the provision of the annular shaped gasket 13, which said gasket may be suitably held in place, although I prefer to secure it in place by means of the short tubular member 14 extending up from the bottom of the sink portion 3 and secured thereto by an annular flange 15 which is bolted or otherwise secured in place and resting on the gasket 13 in the manner shown. This member 14 extends approximately half way up into the sink portion 3 and its upper portion is surrounded by a depending annular flange 16 formed integral with the plate 9, with the lower edge of said flange below the upper edge of the member 14 a sufficient distance to cause any water entering the sink through the perforations 11 in the outer portion of the plate 9, to first descend and then to rise before entering the member 14 and thence into the trap 3. In this way, a large portion of the sediment passing with the water into the sink portion 3, will lodge itself on the bottom of the sink around the member 14. The flange 16 depends from the plate 9 preferably intermediate the two sets of perforations 11, so that one set surrounds said flange and the other set communicates with the interior of the sink portion 3 above the member 14. With such a construction and arrangement of parts in the sink and perforations in the plate 9, it will be observed that the danger of the trap becoming air bound is entirely obviated, as the centrally disposed set of openings 11 will prevent such a state of affairs and form a passage for the water directly into the member 14 and from thence directly into the trap 3.

The opening 4 in the bottom of the trap 3 has its wall tapered to form a valve seat for the ball valve 12, which will seat itself in the manner shown in dotted lines in Fig. 1, if for any reason the water should all be drawn from the body of the trap and thereby prevent sewer-gas from escaping into the building in which the trap is located. On the other hand, in the event of any overflow or rush of back-water in the sewer, the ball valve 12 is raised by the pressure of the water and seats itself firmly against the gasket 13 and the flooding of the water through the trap and into the cellar is thereby prevented.

The chamber 5 has its lowermost point directly beneath the trap portion 3 and connected therewith and preferably extending therefrom is a water feed pipe or lateral 17 which extends upwardly at a suitable point, preferably adjacent a side wall and connects with a city water supply or some other supply under pressure. At a suitable point on the pipe 17, preferably at some point within reach of an operator and above the floor line, is provided a suitable valve 18 to control the flow of water to the trap, as the pipe 17 is employed merely as a clean out in case the chamber 5 or the pipe 6 should become clogged from any cause whatever, when the valve 18 may be turned on and the lower portion of the trap and pipe 6 flushed, through the action of the water passing into the trap through the pipe 17, and out through the pipe 6. When such operation takes place the ball valve will operate in the same manner to seat itself on the valve seat formed by the gasket 13, as it does in the event of an overflow or rush of back-water.

Having thus fully described my invention, what I claim and desire to secure by Letters Patent of the United States, is:—

A device of the class described comprising a sink portion, a trap basin integral therewith and having inlet communications therewith, a removable gasket surrounding said inlet, a flanged tubular member superimposed upon said gasket, extending up into the sink and affixed to the bottom thereof, a cover for the sink having a series of openings disposed centrally thereof and a series around the outside thereof, an annular flange depending from the cover between said two series of openings and encircling said tubular member, a discharge pipe integral with both the trap basin and the sink, and having inlet communications with each, and removable means for stopping said inlets.

In testimony whereof I affix my signature, in presence of two witnesses.

FRANCIS A. McLOUGHLIN.

Witnesses:
 LAURA E. CLAYPOOL,
 CHAS. W. LA PORTE.